United States Patent
Kent et al.

[11] Patent Number: 5,880,927
[45] Date of Patent: Mar. 9, 1999

[54] CIRCUIT BREAKER FASTENER

[75] Inventors: Benjamin Haley Kent, Crozet; Steven Franklin Hovanic, Gordonsville, both of Va.

[73] Assignee: Siemens Energy & Automation, Inc., Alpharetta, Ga.

[21] Appl. No.: 727,962

[22] Filed: Oct. 9, 1996

Related U.S. Application Data

[63] Continuation of Ser. No. 542,569, Oct. 13, 1995, abandoned, which is a continuation of Ser. No. 214,882, Mar. 17, 1994, abandoned.

[51] Int. Cl.⁶ .................................................... H02B 1/04
[52] U.S. Cl. ................... 361/634; 200/334; 411/512; 411/907; 361/654
[58] Field of Search ........................... 361/627, 634, 361/635, 636, 644, 652, 653, 673, 654–658, 704, 707; 200/50.01, 50.02, 321, 334, 293, 294; 403/326, 390, 405.1, 408.1; 411/352, 511, 512, 904, 907; 248/316.7, 27.3, 316.5, 505, 510; 267/150, 160; 24/300, 326, 336, 340, 355, 297, 457, 458, 473, 464, 489, 517, 580, 625

[56] References Cited

U.S. PATENT DOCUMENTS

| | | | |
|---|---|---|---|
| 3,144,587 | 8/1964 | Darlow | 361/634 |
| 3,218,519 | 11/1965 | Casey | 361/634 |
| 3,360,690 | 12/1967 | Hammerly | 361/654 |
| 3,711,748 | 1/1973 | Dietz | 317/112 |
| 3,743,891 | 7/1973 | Buxton | 317/119 |
| 4,557,047 | 12/1985 | M'Sadoques | 29/854 |
| 4,742,608 | 5/1988 | M'Sadoques | 29/453 |
| 4,905,122 | 2/1990 | Culnan | 361/376 |
| 5,047,604 | 9/1991 | Grass | 200/294 |
| 5,172,300 | 12/1992 | Morby | 361/355 |
| 5,270,503 | 12/1993 | Frye | 200/43.14 |
| 5,304,755 | 4/1994 | Romano | 200/50 AA |
| 5,357,404 | 10/1994 | Bright | 361/818 |

*Primary Examiner*—Gerald Tolin

[57] ABSTRACT

A fastener for a reverse fed panelboard circuit breaker is taught. Briefly stated, a resiliently deformable pivoting member is disposed between side barrier fins in a two pole panelboard breaker. A pin at one end of the fastener is placed through a screw hole which is contained in the panelboard and disposed between the side barriers of the panelboard breaker, with the fastener rotatably urged towards the breaker so as to, when fully rotated causes the breaker retention tab to be urged against the panelboard retention hook and also for the fastener to lay against and come in contact with the edge of the panelboard breaker thereby preventing removal of the breaker without first removing the fastener.

3 Claims, 2 Drawing Sheets

CIRCUIT BREAKER FASTENER

This application is a continuation of application Ser. No. 08/542,569 filed Oct. 13, 1995 now abandoned, which is a continuation of Ser. No. 08/214,882, Mar. 17, 1994 also now abandoned.

FIELD OF THE INVENTION

This invention relates, generally, to panelboard type circuit breakers and more particularly to a fastener for panelboard type circuit breakers for preventing the inadvertent removal of the breaker therefrom.

BACKGROUND OF THE INVENTION

It is known that there are three principal components of an electrical distribution panelboard; the main breaker, the branch breakers and the panel bus bars. The main breaker, of course, controls the electrical supply to the panelboard itself and serves as a manual disconnect and an overcurrent device. This is generally required for safety and as part of the electrical code. Some main breakers are bolted to the panel bus bars in order to establish an electrical connection. This is particularly so where high current applications are encountered. However, it is frequently the case that in situations where the main breakers are rated for approximately 125 amperes or less, a plug-on connection is used with the panel bus bars. This plug-on type connection is generally the same as the branch circuit breakers.

However, when a main breaker is connected in a plug-in fashion as described above, it is generally described as a back-fed or reverse-fed breaker. The reason for this is that the breaker's wire terminals receive supply wires rather than serve load wires as do the branch breakers. The plug-on connection referred to above is generally via a spring-loaded jaw terminal that is part of the breaker. This jaw grips the panel bus which thereby effects a physical and electrical connection through spring and friction force alone. As such, plug-on breakers are removed as easily as they are installed, that is, without the use of a tool but rather by simply pulling them off the bus bar.

However, recommended, normal and customary safety practices dictate that the power supply to the panel is disconnected before these reverse fed breakers are removed. Typically the individual removing the breakers must go to a separate location (i.e., a power meter, main panel or the like) in order to remove power from the wires feeding the reverse-fed breaker. As one might expect, these recommendations and procedures are sometimes ignored. The result is that when a back fed or reverse fed main breaker is removed without disconnecting the power supply, the breaker's jaws remain electrically live. Therefore, if the person removing the breaker mistakenly assumes or thinks that a branch breaker has been removed, the individual will be generally unaware of the hazard associated with the live jaw on the breaker.

As a direct result of the above, the National Electrical Code and Underwriters Laboratories, Inc. standards dictate and require that an additional fastener be used to secure back fed circuit breakers and similar devices. The logic behind this is to ensure that an extra step is utilized before the breaker can be removed thereby indicating to the individual that this is a back fed breaker and not merely a branch breaker.

Accordingly, a number of schemes have been tried which attempt to physically fasten the breaker to the panelboard. Generally, these attempts utilize screws, clips and the like which are cumbersome and difficult to install, remove and therefore are themselves sometimes simply ignored. Examples of different fastening devices may be found in, for example, U.S. Pat. No. 4,557,047 "Retainer for Molded Case Circuit Breakers" issued Dec. 10, 1985 to M'Sadoques et. al. There, a screw-in conjunction with a rear mounted retainer clip and plate is utilized. Another example of a fastener may be found in U.S. Pat. No. 4,742,608 "Method of Retaining Molded Case Circuit Breakers" issued May 10, 1988 to M'Sadoques et. al. Again, this breaker utilizes a mounting clip or tab which is fastened by a screw to the breaker. Other fastening attempts or schemes have also encompassed brackets and the like, all of which require fastening by use of a screw or the like.

Accordingly, it would be advantageous to provide a retaining mechanism for a breaker which does not require screws, lugs and the like in order to retain the breaker in the panelboard while still satisfying Underwriters Laboratories and the National Electrical Code.

It is yet another object of the present invention to produce a retaining device which is inexpensive to manufacture.

Still another object is to provide a retaining device which is retrofitable with and usable with existing panelboards, breakers and the like.

Still yet another object of the present invention is to produce a retaining device which is simple and easy to use, and thereby be more likely to be used.

Still another object of the present invention is to produce a fastening device which does not require tools or the like for its installation.

It is still yet another object of the present invention to produce a fastener for fixedly securing a circuit breaker in a panelboard so as to inhibit its removal therefrom, comprising a fastening member having a first and second end, a support block disposed at the first end, the support block having a pin extending therefrom wherein the pin is disposable in an aperture in the panelboard, the pin facilitating pivoting of the fastener with respect to the circuit breaker, a fastener bar disposed at the second end, the fastener bar engageable with a portion of the circuit breaker such that the fastening member prevents removal of the circuit breaker from the panelboard.

BRIEF DESCRIPTION OF THE DRAWINGS

Reference may be now had to the accompanying drawings in which.

DETAILED DESCRIPTION OF THE PREFERRED EMBODIMENT

Figure 1:
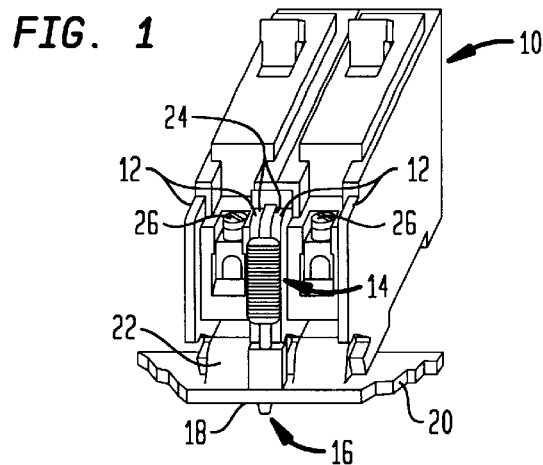
FIG. 1 is a perspective view of the molded case circuit breaker of the present invention utilizing the fastener of the present invention.
Figure 2:
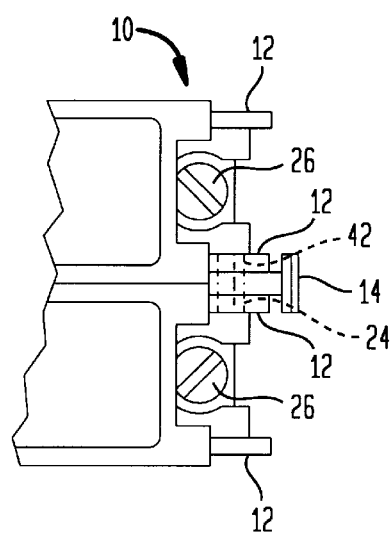
FIG. 2 is a top view of the breaker and fastener shown in FIG. 1.

Referring now to FIGS. 1 and 2 there is shown a perspective and top view respectively of a circuit breaker to be used in conjunction with the fastener of the present invention. More particularly, shown is a two-pole panelboard breaker shown generally at 10. In this regard, it is to be understood that the present invention may be used with any two similarly molded breakers which are fastened together to act in concert as is typically the case in panelboard applications. In this regard, the present invention may be utilized where, for example, three breakers are attached together without departing from the spirit and scope of the present invention. The present breakers 10 are generally "ganged" by rivets, screws or otherwise fastened together (not shown).

Accordingly, there is shown in the preferred embodiment of the present invention, a two pole panelboard breaker shown generally at 10. Each breaker has two side barriers or fins 12. The fastener of the present invention shown generally at 14 is disposed between adjacent side barriers or fins 12 which create a space when individual breakers are ganged together. Also shown is a fastener locating pin 16 which is part of fastener 14 and extends through panelboard screw hole 18. This screw hole 18 is part of panelboard mounting rail 20. In existing panelboards it is the screw hole 18 which would be utilized to place or attach a mounting bracket or the like, as previously discussed, in order to retain breaker 10 in the panelboard.

Figure 4:
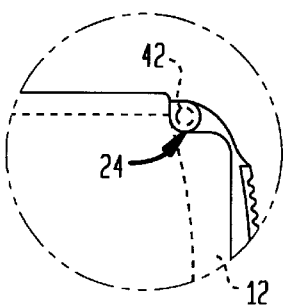
FIG. 4 is a detailed side elevational view of the retaining snap fit mechanism of the present invention.

The top portion of fastener 14 rests along a detent area 24 (shown more clearly in FIGS. 3 and 4 and discussed more fully below). Power lugs 26 are utilized to present power to the breaker which would thereafter energize the entire panelboard through lugs (not shown) on breaker 10 as is ordinary and customary in the art.

Figure 3:
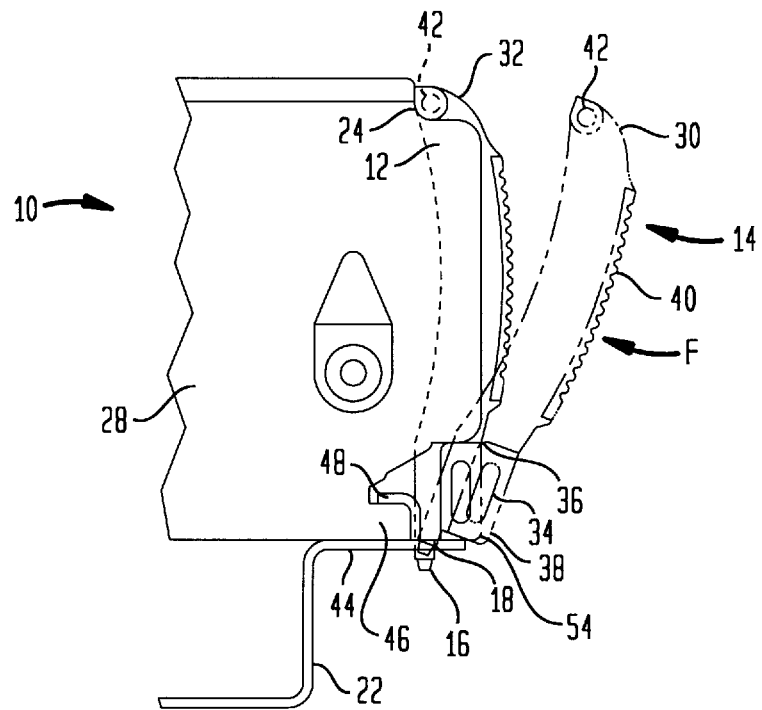
FIG. 3 is a side elevational view of a portion of the breaker shown in FIG. 1 and illustrating use of the fastener of the present invention.

Referring now to FIG. 3 there is shown an elevational view indicating the use of the fastener of the present invention in the interim and fully engaged position as described more fully below. There it can be seen how panelboard flange 22 is configured so as to form a panelboard or breaker platform 44 having a panelboard retention hook 48 thereon. This illustrates how panelboard breaker 10 is interconnected and engaged with the panelboard, specifically breaker housing side 28 having a breaker retention tab 46 at one end thereof. Also showing is how breaker retention tab 46 engages and is disposed between breaker platform 44 and retention hook 48. Adjacent to the retention tab 46 is a ledge 38, which extends away from the circuit breaker 10. Upon engagement and use of fastener 14, it is evident how fastener locating pin 16 is disposed through panelboard screw hole 18.

Fastener 14 is comprised of a support block 34 which is disposable between circuit breaker upper surface 36 and ledge 38 so as to fully engage the lower portion of breaker 10. Fastener 14 has disposed along one edge a thumb pad 40 and at the upper portion distant from support block 34, a fastener bar 42. Fastener bar 42 engages detent area 24 (shown more clearly in FIG. 4). Detent area 24 in the preferred embodiment of the present invention is used to positively engage the fastener bar 42 to latch the fastener 14 between side barriers or fins 12.

Shown in FIG. 3 is the fastener in two different positions, a non-engaged or interim position 30 and an engaged or locked position 32. In this fashion, it is evident how fastener 14 is easily inserted by simply inserting locating pin 16 into panelboard screw hole 18 and pushing on the thumb pad 40 towards the panelboard breaker 10 thereby physically retaining panelboard breaker 10 in a panelboard. Breaker 10 therefore cannot be removed unless and until fastener 14 is disengaged and removed entirely. It has also been found that the mere fact this fastener is now readily visible and easy to utilize, it is in fact practiced on a more regular basis rather than discarded or only intermittently used.

Figure 5A:
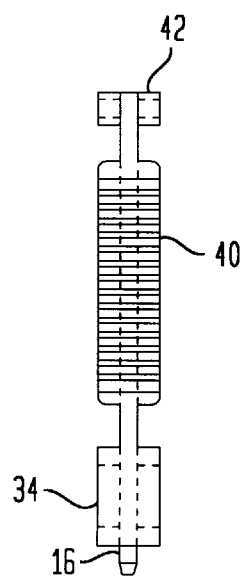
FIGS. 5a and 5b are end and side elevational views of the actual fastener as contemplated by the present invention.
Figure 5B:
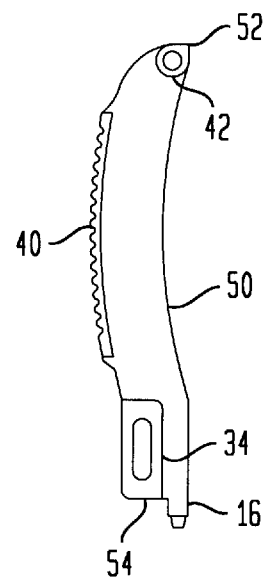

Referring now to FIGS. 5a and 5b there are shown two side elevational views of the fastener 14 of the present invention. Shown in particular is the proportion of support block 34 in relation to the thumb pad 40 as well as fastener bar 42. It is to be understood that these proportions may be changed to reflect different breaker configurations, but of course, are generally limited by the dimensions between the adjacent side barriers or fins 12 (FIGS. 1 and 2). Also evident is the curved nature of fastener 14 as shown by resilient beam 50 as well as square edges shown generally at 52. These adjacent square edges are made to engage detent area 24. It is to be understood that the proportions and dimensions of fastener bar 42 and square edges 52 in relation to detent area 24 may be changed such as to require more or less "locking" or engagement thereby making it more or less difficult to pivot fastener 14 away from or towards breaker 10. Further, support block 34 is also, in the preferred embodiment of the present invention, sized such that they engage surfaces 36 and 38 which in effect forces breaker retention tab 46 upwardly against panelboard retention hook 48, thereby also resulting in a "locking" of the breaker 10 into the panelboard. The support block 34 further has a shelf 54 for engaging the ledge 38 shown in FIG. 3.

Referring now to FIG. 3, in practice once the breaker 10 is inserted into the panelboard, the user would insert the locating pin 16 into panelboard screw hole 18. With pin 16 acting as a pivot, thumb pressure exerted along thumb pad 40 is exerted so as to rotate the fastener towards the breaker which in effect causes the support block 34 to rotate counterclockwise (as viewed in FIG. 3). The fastener 14 is pushed until the fastener bar 42 assumes a stable over-center position with the fastener bar 42 engaging detent area 24 and in effect also resting against the base of the housing of the breaker 10. At the same time the shelf 54 engages the ledge 38, which enables the support block 34 to be positioned between the ledge 38 and the circuit breaker upper surface 36. In the preferred embodiment of the present invention the fastener is a molded thermoplastic design thereby minimizing any chance of electrical shock. Also, due to the cross section and the effect of resilient beam 50, the fastener 14 will deflect slightly upon installation. Therefore the installation forces remain within acceptable limits while fixedly maintaining the breaker in position.

While the detent area 24, as previously mentioned is provided at the top of the barrier or fins 12, in order to enhance some of the locking characteristics, the detent may be enlarged or minimized as appropriate without departing from the spirit and scope of the present invention. Additionally, a second set of detents may also be provided if desired at the bottom edge of the barriers 12 if the fastener is provided with an additional structure to engage them, without departing from the spirit and scope of the present invention.

As a result of the above, it has been found that if an attempt is made to rotate the circuit breaker and thereby disengage it with sufficient force to cause the electrical connection to be broken (i.e., rotating the breaker clockwise as viewed in FIG. 3), the fastener aids in forming a resisting force formed by circuit breaker upper surface 36, the underside of barriers 12 and panelboards surface 38 so as effectively inhibit rotation. Additionally, by virtue of square edges 52, fastener bar 42 is made more difficult to remove with the result that a tool, such as, for example, a screwdriver or the like is needed to fit between the square edge 52 and the breaker body in order to pry fastener 14 off the breaker 10. In this fashion, easy removal is not made possible thereby enhancing the safety characteristics while apprising individuals attempting to do such that this is a back-fed breaker which must be handled accordingly.

It is to be understood that the present description of the preferred embodiment is for exemplary purposes only and that the invention therein is to be limited only by the claims appended hereto.

What is claimed is:

1. A fastener for fixedly securing a circuit breaker in a panelboard so as to inhibit its removal therefrom, comprising:

a panelboard having at least one circuit breaker disposable therein, the panelboard further having at least one retention hook and wherein an aperture is disposed adjacent the retention hook;

at least one circuit breaker having a retaining tab, the retaining tab engaged with the retention hook, and further having a ledge adjacent the retaining tab, the ledge extending away from the circuit breaker, the circuit breaker also having a detent area disposed away from the retaining tab; and a fastening member having a first end and a second end, the fastening member, having:

a support block disposed at the first end, the support block having a shelf which is engaged with the ledge on the circuit breaker, the support block also having a pin extending therefrom wherein the pin is disposed in the aperture in the panelboard, the pin facilitating pivoting of the fastening member toward and away from the circuit breaker such that the support block shelf engages the ledge with the fastening member urged toward the circuit breaker; and a fastener bar disposed at the second end, the fastener bar engaged with the detent area of the circuit breaker such that the fastening member is retained in a position adjacent the circuit breaker.

2. A device according to claim 1 wherein the circuit breaker is a molded case circuit breaker.

3. A device according to claim 2 wherein at least two circuit breakers are fastened together, and wherein the fastening member is positioned in the area where the circuit breakers are adjacent each other.

\* \* \* \* \*